(12) United States Patent
Jeong et al.

(10) Patent No.: US 12,400,792 B2
(45) Date of Patent: Aug. 26, 2025

(54) MULTILAYER ELECTRONIC COMPONENT

(71) Applicant: SAMSUNG ELECTRO-MECHANICS CO., LTD., Suwon-si (KR)

(72) Inventors: Hye Yun Jeong, Suwon-si (KR); Dong Jun Jung, Suwon-si (KR); Hyun Sik Chae, Suwon-si (KR); Ji Eun Park, Suwon-si (KR); Sim Chung Kang, Suwon-si (KR); Dae Jin Shim, Suwon-si (KR); Eun Jung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 127 days.

(21) Appl. No.: 18/387,139

(22) Filed: Nov. 6, 2023

(65) Prior Publication Data
US 2024/0249882 A1   Jul. 25, 2024

(30) Foreign Application Priority Data
Jan. 20, 2023   (KR) .......................... 10-2023-0008871

(51) Int. Cl.
*H01G 4/12*   (2006.01)
*H01G 4/012*   (2006.01)
*H01G 4/30*   (2006.01)

(52) U.S. Cl.
CPC ........... *H01G 4/1227* (2013.01); *H01G 4/012* (2013.01); *H01G 4/30* (2013.01)

(58) Field of Classification Search
CPC ........ H01G 4/1227; H01G 4/012; H01G 4/30; H01G 4/32
See application file for complete search history.

(56) References Cited

U.S. PATENT DOCUMENTS

2010/0181200 A1\* 7/2010 Yang ..................... B82Y 40/00
427/113
2015/0348712 A1\* 12/2015 Lee .......................... H01G 4/30
156/89.12

(Continued)

FOREIGN PATENT DOCUMENTS

JP   2019-212716 A   12/2019

OTHER PUBLICATIONS

Search Report dated May 22, 2024 issued in corresponding European Patent Application No. 23209439.1.

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and internal electrodes, and including first and second surfaces, third and fourth surfaces, fifth and sixth surfaces, external electrodes disposed on the third and fourth surfaces, and side margin portions disposed on the fifth and sixth surfaces. The side margin portions include a first region adjacent to the internal electrodes and a second region adjacent to outside of the side margin portions. In a Raman spectra obtained by analyzing one point located in the first and second region respectively, peak X appears in a Raman shift of 450 $cm^{-1}$ to 600 $cm^{-1}$. When a minimum value of the Raman shift at which the peak X appears in the Raman spectra of the first region is $\lambda(cm^{-1})$, a minimum value of the Raman shift at which the peak X appears in the Raman spectra of the second region is $\lambda+0.75$ $cm^{-1}$ or greater.

18 Claims, 4 Drawing Sheets

(56) References Cited

U.S. PATENT DOCUMENTS

| | | | |
|---|---|---|---|
| 2016/0196918 A1* | 7/2016 | Hong | H01G 4/232 |
| | | | 361/301.4 |
| 2017/0169952 A1* | 6/2017 | Kato | H01G 4/2325 |
| 2018/0012702 A1 | 1/2018 | Azuma et al. | |
| 2018/0261390 A1* | 9/2018 | Sakate | H01G 4/30 |
| 2019/0189353 A1* | 6/2019 | Tanaka | H01G 4/30 |
| 2019/0371528 A1* | 12/2019 | Takashima | H01G 4/012 |
| 2020/0035416 A1* | 1/2020 | Kwon | H01G 4/30 |
| 2020/0126721 A1* | 4/2020 | Fukunaga | H01G 4/012 |
| 2020/0126724 A1 | 4/2020 | Takagi | |
| 2020/0373087 A1 | 11/2020 | Kato | |
| 2021/0202179 A1* | 7/2021 | Saito | H01G 4/1218 |
| 2021/0202180 A1 | 7/2021 | Fukunaga et al. | |
| 2022/0102076 A1 | 3/2022 | Isota et al. | |
| 2022/0139631 A1 | 5/2022 | Yoshida | |
| 2022/0216478 A1* | 7/2022 | Ito | H01M 4/364 |
| 2022/0223344 A1* | 7/2022 | Jung | H01G 4/1227 |
| 2022/0230809 A1 | 7/2022 | Chun et al. | |
| 2022/0367117 A1 | 11/2022 | Lee et al. | |
| 2023/0027057 A1* | 1/2023 | Yamazaki | H01G 4/085 |

* cited by examiner

MULTILAYER ELECTRONIC COMPONENT

CROSS-REFERENCE TO RELATED APPLICATION(S)

This application claims benefit of priority to Korean Patent Application No. 10-2023-0008871 filed on Jan. 20, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type capacitor mounted on the printed circuit boards of various types of electronic products, such as image display devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof, such as compactness, guaranteed high capacitance, and ease of mounting. As various electronic devices, such as computers and mobile devices, have been reduced in size and increased in power, demand for miniaturization and high capacitance of MLCCs have been increased.

MLCCs may generally include a body in which dielectric layers and internal electrodes are alternately disposed and a side margin portion disposed on a side surface of the body to protect the body.

Meanwhile, in order to achieve miniaturization and high capacitance of MLCCs, side margin portions thereof have been thinned, but as the thickness of the side margin portions decreases, moisture resistance reliability of MLCCs may deteriorate.

In particular, when a method of laminating a separate dielectric sheet on the side surface of the body is applied to reduce the thickness of the side margin portion, an interface between the body and the side margin portion, in particular, an interface between a capacitance forming portion in which dielectric layers and internal electrodes are alternately arranged to form capacitance and the side margin portion may be separated due to a difference in internal stress, and external moisture or hydrogen may penetrate into the interface, thereby deteriorating reliability of MLCCs.

Therefore, there is a need for research to improve the moisture resistance reliability of MLCCs by minimizing residual stress mismatch at the interface between the body and the side margin portion by controlling the internal stress of the side margin portion.

SUMMARY

An aspect of the present disclosure is to provide a multilayer electronic component having moisture resistance reliability, while a side margin portion thereof is thinned.

However, the object of the present disclosure is not limited to the above, and will be more easily understood in the course of describing specific exemplary embodiments in the present disclosure.

According to an aspect of the present disclosure, a multilayer electronic component includes a body including a dielectric layer and first and second internal electrodes alternately disposed in a first direction with the dielectric layer interposed therebetween and including first and second surfaces facing each other in the first direction, third and fourth surfaces connected to the first and second surfaces and facing each other in a second direction, and fifth and sixth surfaces connected to the first to fourth surfaces and facing each other in a third direction, an external electrode disposed on the third and fourth surfaces, and a side margin portion disposed on the fifth and sixth surfaces, wherein the side margin portion includes a first region adjacent to the internal electrodes and a second region adjacent to outside of the side margin portions, and in a Raman spectra obtained by analyzing at least one point located in the first region and at least one point located in the second region in a central region in the first direction in a cross-section in the first and third directions of the side margin portions through Raman spectroscopy, peak X appears in a Raman shift of 450 $cm^{-1}$ to 600 $cm^{-1}$, and when a minimum value of the Raman shift at which the peak X appears in the Raman spectra of the first region is $\lambda(cm^{-1})$, a minimum value of the Raman shift at which the peak X appears in the Raman spectra of the second region is $\lambda+0.75$ $cm^{-1}$ or greater.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
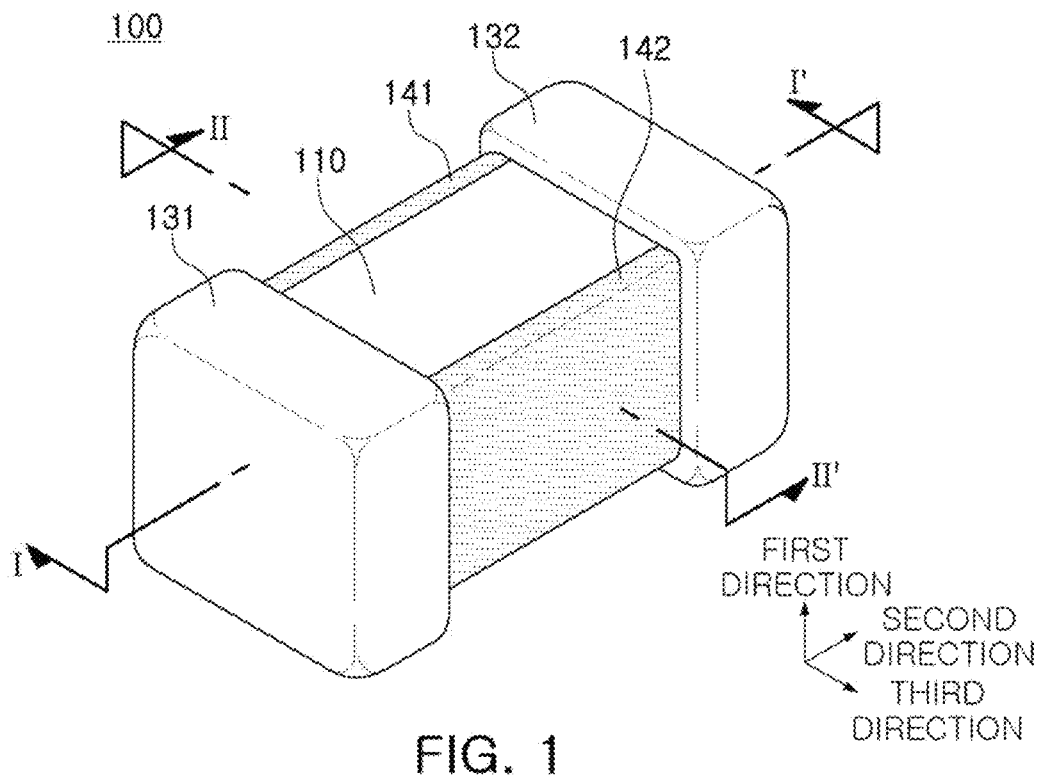
FIG. 1 is a perspective view schematically illustrating a multilayer electronic component according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations, such as "comprises" or "comprising," will be understood to imply the inclusion of stated elements but not the exclusion of any other elements.

In the drawing, a first direction may be defined as a thickness (T) direction, a second direction may be defined as a length (L) direction, and a third direction may be defined as a width (W) direction.

Multilayer Electronic Component

FIG. 1 is a perspective view schematically illustrating a multilayer electronic component according to an exemplary embodiment in the present disclosure.

Figure 2:
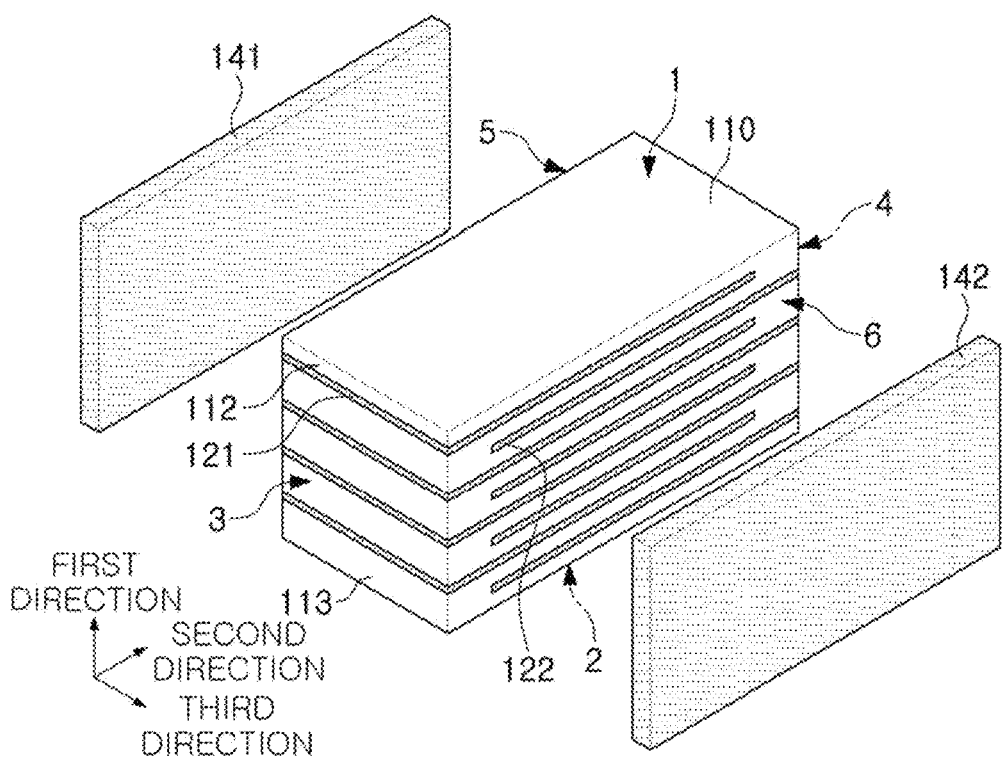
FIG. 2 is an exploded perspective view schematically illustrating a body and side margin portions illustrated in FIG. 1.

FIG. 2 is an exploded perspective view schematically illustrating a body and side margin portions of FIG. 1.

Figure 3:
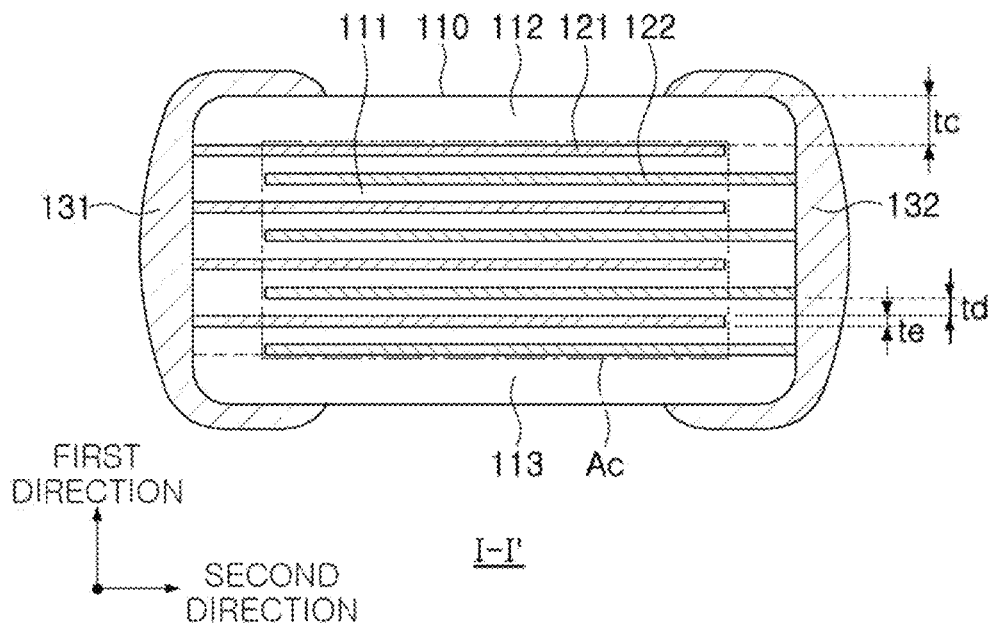
FIG. 3 is a cross-sectional view taken along line I-I' illustrated in FIG. 1.

FIG. 3 is a cross-sectional view taken along line I-I' of FIG. 1.

Figure 4:
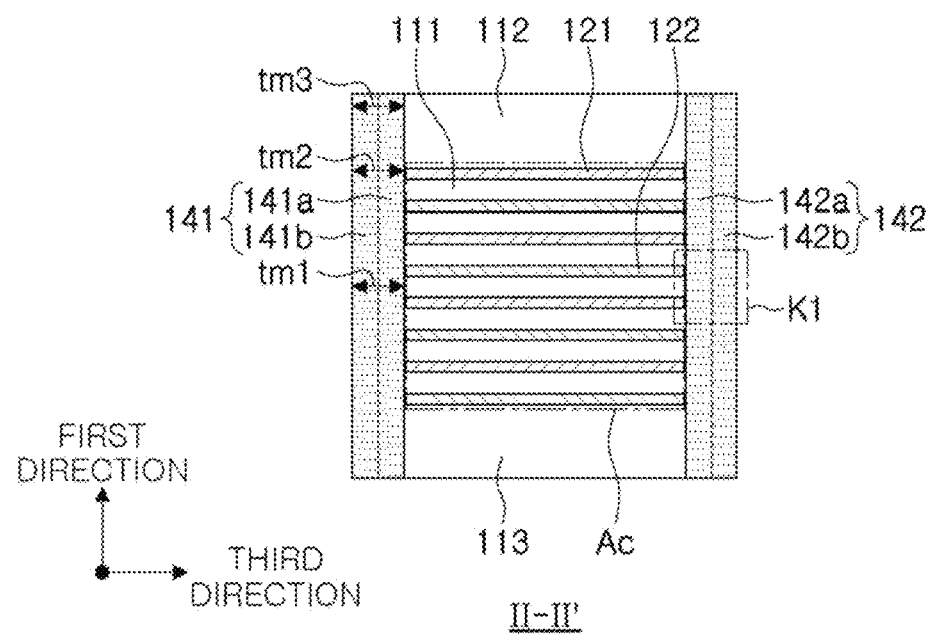
FIG. 4 is a cross-sectional view taken along line II-II' illustrated in FIG. 1.

FIG. 4 is a cross-sectional view taken along line II-II' of FIG. 1.

Figure 5:
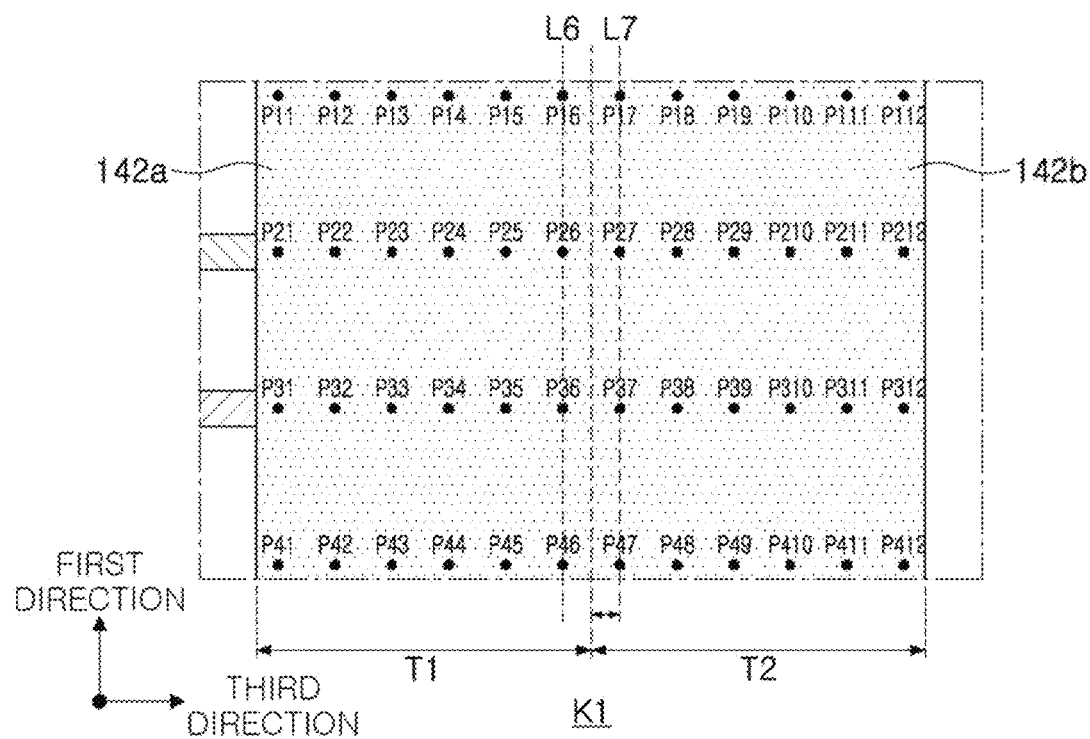
FIG. 5 is an enlarged view of region K1 illustrated in FIG. 4.

FIG. 5 is an enlarged view of region K1 of FIG. 4.

Figure 6:
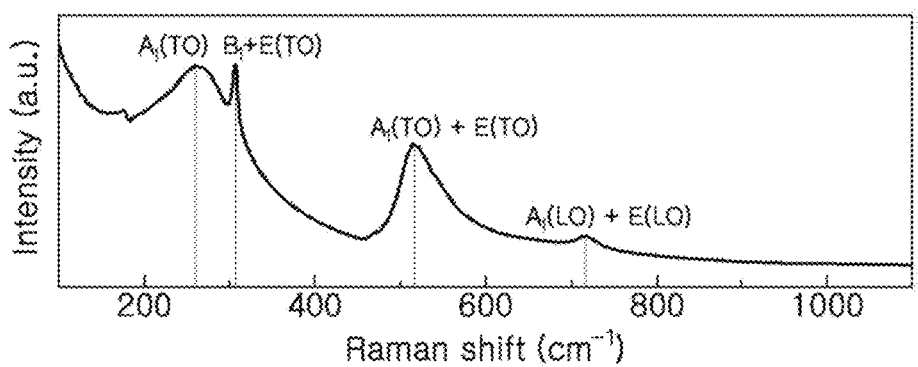
FIG. 6 is a diagram schematically illustrating a Raman spectrum of a $BaTiO_3$-based material.

FIG. 6 is a diagram schematically illustrating a Raman spectrum of a $BaTiO_3$-based material.

Figure 7:
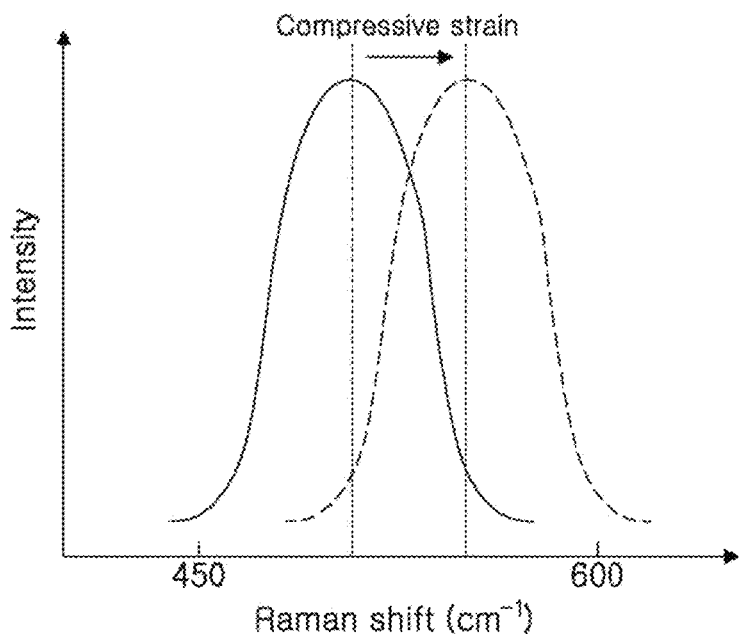
FIG. 7 is a diagram illustrating a relationship between peaks appearing in the Raman spectrum of a $BaTiO_3$-based material and compressive strain.

FIG. 7 is a diagram illustrating a relationship between peaks appearing in the Raman spectrum of a $BaTiO_3$-based material and compressive strain.

Figure 8:
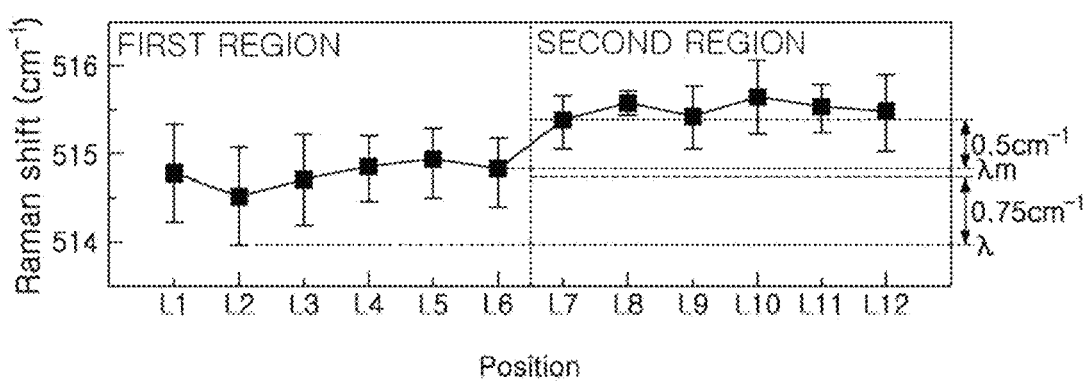
FIG. 8 is a diagram illustrating a Raman shift in which a peak X appears in Raman spectra obtained by analyzing a plurality of points located in a first region and a second region through Raman spectroscopy.

FIG. 8 is a diagram illustrating a Raman shift in which a peak X appears in Raman spectra obtained by analyzing a plurality of points located in a first region and a second region through Raman spectroscopy.

Hereinafter, a multilayer electronic component 100 according to an exemplary embodiment in the present disclosure will be described in detail with reference to FIGS. 1 to 8. In addition, a multilayer ceramic capacitor (MLCC) will be described as an example of the multilayer electronic component, but the present disclosure is not limited thereto and may be applied to various multilayer electronic components, such as inductors, piezoelectric devices, varistors, or thermistors.

The multilayer electronic component 100 according to an exemplary embodiment in the present disclosure may include a body 110 including a dielectric layer 111 and first and second internal electrodes 121 and 122 alternately disposed in the first direction with the dielectric layer 111 interposed therebetween and including first and second surfaces 1 and 2 facing each other in the first direction, third and fourth surfaces 3 and 4 connected to the first and second surfaces and facing each other in the second direction, and fifth and sixth surfaces 5 and 6 connected to the first to fourth surfaces and facing each other in the third direction; external electrodes 131 and 132 disposed on the third and fourth surfaces; and side margin portions 141 and 142 disposed on the fifth and sixth surfaces, wherein the side margin portions 141 and 142 may include first regions 141a and 142a adjacent to the internal electrodes and second regions 141b and 142b adjacent to outside of the side margin portions, and in the Raman spectra obtained by analyzing at least one point located in the first regions 141a and 142a and at least one point located in the second regions 141b and 142b in a central region in the first direction of cross-sections in the first and third directions of the side margin portions 141 and 142 through Raman spectroscopy, peak X appears in a Raman shift of 450 $cm^{-1}$ to 600 $cm^{-1}$, and when a minimum value of the Raman shift at which the peak X appears in the Raman spectra of the first regions 141a and 142a is λ ($cm^{-1}$), a minimum value of the Raman shift at which the peak X appears in the Raman spectra of the second regions 141b and 142b may be λ+0.75 $cm^{-1}$ or greater.

As described above, due to the structure in which the dielectric layer 111 and the internal electrodes 121 and 122 are alternately stacked, a relatively high tensile strain may occur in the body 110, compared to the side margin portions 141 and 142. As a result, a phenomenon in which an interface between the body 110 and the side margin portions 141 and 142 is parted may occur due to a stress mismatch between the body 110 and the side margin portions 141 and 142 and reliability of the multilayer electronic component 100 may deteriorate as external moisture and/or hydrogen penetrates through the interface between the body 110 and the side margin portions 141 and 142.

Meanwhile, in the side margin portions 141 and 142 according to an exemplary embodiment in the present disclosure, the first regions 141a and 142a adjacent to the body 110 have tensile stress higher than the second regions 141b and 142b, stress mismatch between the body 110 and the side margin portions 141 and 142 may be minimized, thereby preventing a phenomenon in which the interface between the body 110 and the side margin portions 141 and 142 is opened.

Meanwhile, as the tensile stress remaining in the side margin portions 141 and 142 is higher, cracks may more easily occur due to external impact, but in the side margin portions 141 and 142 according to an exemplary embodiment in the present disclosure, since the second regions 141b and 142b adjacent to the outside of the side margin portions have a compressive strain compared to the first regions 141a and 142a, cracks caused by external impact may be prevented, thereby improving reliability of the multilayer electronic component 100.

Hereinafter, each component included in the multilayer electronic component 100 according to an exemplary embodiment in the present disclosure will be described in more detail.

Although a specific shape of the body 110 is not particularly limited, as shown, the body 110 may have a hexahedral shape or a shape similar thereto. Due to the shrinkage of ceramic powder included in the body 110 or polishing of corners during a sintering process, the body 110 may not have a perfectly straight hexahedral shape but may have a substantially hexahedral shape.

The body 110 may include the first and second surfaces 1 and 2 facing each other in the first direction, the third and fourth surfaces 3 and 4 connected to the first and second surfaces 1 and 2 and facing each other in the second direction, and the fifth and sixth surfaces 5 and 6 connected to the first to fourth surfaces 1, 2, 3, and 4 and facing each other in the third direction.

In the body 110, the dielectric layers 111 and the internal electrodes 121 and 122 may be alternately stacked. The plurality of dielectric layers 111 constituting the body 110 are in a sintered state, and adjacent dielectric layers 111 may be integrated such that boundaries therebetween may not be readily apparent without using a scanning electron microscope (SEM).

The dielectric layer 111 may be formed by preparing a ceramic slurry including ceramic powder, an organic solvent, and a binder, applying and drying the slurry on a carrier film to prepare a ceramic green sheet, and then firing the ceramic green sheet. The ceramic powder is not particularly limited as long as sufficient capacitance may be obtained, but for example, a barium titanate-based material, a lead composite perovskite-based material, or a strontium titanate-based material may be used. Examples of the ceramic powder include $BaTiO_3$ and $(Ba_{1-x}Ca_x) TiO_3$ (0<x<1), $Ba(Ti_{1-y}Ca_y)O_3$ (0<y<1), $(Ba_{1-x}Ca_x) (Ti_{1-y}Zr_y)O_3$ (0<x<1, 0<y<1) or $Ba (Ti_{1-y}Zr_y)O_3$ (0<y<1) in which Ca, Zr, etc. is partially dissolved in $BaTiO_3$.

The internal electrodes 121 and 122 may be alternately disposed with the dielectric layer 111. For example, the first internal electrode 121 and the second internal electrode 122, which are a pair of electrodes having different polarities, may be alternately disposed in the first direction with the dielectric layer 111 interposed therebetween. The first internal electrode 121 and the second internal electrode 122 may be electrically separated from each other by the dielectric layer 111 disposed therebetween.

The first internal electrode 121 may be disposed to be connected to the third, fifth, and sixth surfaces 3, 5, and 6 and spaced apart from the fourth surface 4. In addition, the second internal electrode 122 may be disposed to be connected to the fourth, fifth, and sixth surfaces 4, 5, and 6 and spaced apart from the third surface 3.

Conductive metals included in the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by applying a conductive paste for internal electrodes including a conductive metal to have a predetermined thickness on a ceramic green sheet and firing the conductive paste. As a method of printing the conductive paste for internal electrodes, a screen-printing method or a gravure printing method may be used, but the present disclosure is not limited thereto.

The body 110 may include a capacitance forming portion Ac disposed inside the body 110 and forming capacitance by including the first and second internal electrodes 121 and 122 alternately disposed with the dielectric layer 111 interposed therebetween and a first cover portion 112 and a second cover portion 113 respectively disposed on both end surfaces of the capacitance forming portion Ac facing each other in the first direction. The cover portions 112 and 113 may basically serve to prevent damage to the internal electrodes due to physical or chemical stress. The cover portions 112 and 113 may have the same dielectric composition as that of the dielectric layer 111 except that they do not include internal electrodes, but the present disclosure is not limited thereto, and the cover portions 112 and 113 may have a dielectric composition different from that of the dielectric layer 111.

The external electrodes 131 and 132 may be disposed on the third and fourth surfaces 3 and 4 of the body 110, and extend onto portions of the first, second, fifth, and sixth surfaces. In addition, the external electrodes 131 and 132 may include a first external electrode 131 connected to the first internal electrode 121 and a second external electrode 132 connected to the second internal electrode 122.

The external electrodes 131 and 132 may be formed by dipping the third and fourth surfaces 3 and 4 of the body 110 in a conductive paste for external electrodes including a conductive metal and glass and then performing sintering. Alternatively, the external electrodes 131 and 132 may be formed by transferring a sheet including conductive metal and glass.

The conductive metal included in the external electrodes 131 and 132 may be copper (Cu), nickel (Ni), palladium (Pd), platinum (Pt), gold (Au), silver (Ag), lead (Pb), and/or alloys thereof, but the present disclosure is not limited thereto.

Also, although not shown, a first plating layer may be disposed on the first external electrode 131 and a second plating layer may be disposed on the second external electrode. The plating layers may improve mounting characteristics. The type of the plating layers is not particularly limited, and may be plating layers including nickel (Ni), tin (Sn), palladium (Pd), and/or alloys thereof, or may be formed of a plurality of layers. The plating layers may be, for example, nickel (Ni) plating layers or tin (Sn) plating layers, or may have a form in which a nickel (Ni) plating layer and a tin (Sn) plating layer are sequentially formed. In addition, the plating layers may include a plurality of nickel (Ni) plating layers and/or a plurality of tin (Sn) plating layers.

In the drawings, a structure in which the multilayer electronic component 100 has two external electrodes 131 and 132 is described, but the present disclosure is not limited thereto, and the number or shape of the external electrodes 131 and 132 may be determined according to the shape of the internal electrodes 121 and 122 or other purposes.

The side margin portions 141 and 142 may be disposed on the fifth and sixth surfaces 5 and 6. The side margin portions may include a first side margin portion 141 disposed on the fifth surface and a second side margin portion 142 disposed on the sixth surface. The side margin portions 141 and 142 may basically serve to prevent damage to the internal electrodes 121 and 122 due to physical or chemical stress.

The side margin portions 141 and 142 may include a $BaTiO_3$-based material, as a main component, and here, the $BaTiO_3$-based material may include $BaTiO_3$ and $(Ba_{1-x}Ca_x) TiO_3$ (0<x<1), $Ba (Ti_{1-y}Ca_y)O_3$ (0<y<1), $(Ba_{1-x}Ca_x) (Ti_{1-y}Zr_y)O_3$ (0<x<1, 0<y<1) or $Ba (Ti_{1-y}Zr_y)O_3$ (0<y<1) in which Ca, Zr, and the like are partially dissolved in $BaTiO_3$. The side margin portions 141 and 142 may include substantially the same material as that of the dielectric layer 111, but the present disclosure is not limited thereto.

Hereinafter, the first regions 141a and 142a and the second regions 141b and 142b of the side margin portions 141 and 142 will be described in more detail. Meanwhile, although FIG. 5 illustrates the first region 142a and the second region 142b of the second side margin portion 142, the first side margin portion 141 and the second side margin portion 142 are symmetrical to each other in the third direction, and thus, the description with reference to FIG. 5 is regarded as including the description of the first side margin portion 141.

The side margin portions 141 and 142 may include first regions 141a and 142a adjacent to the body 110 and second regions 141b and 142b adjacent to the outside of the side margin portion. According to an exemplary embodiment in the present disclosure, in the Raman spectra obtained by analyzing at least one point located in the first regions 141a and 142a and at least one point located in the second regions 141b and 142b in a central region in the first direction of cross-sections in the first and third directions of the side margin portions 141 and 142 through Raman spectroscopy, peak X appears in a Raman shift of 450 $cm^{-1}$ to 600 $cm^{-1}$. Here, the cross-sections in the first and third directions of the side margin portions 141 and 142 may be cross-sections in the first and third directions taken in the center of the side margin portions 141 and 142 in the second direction, for example.

For example, referring to FIGS. 4 and 5, in the Raman spectra obtained by analyzing at least one point P11 to P16, P21 to P26, P31 to P36, and P41 to P46 located in the first region 142a through Raman spectroscopy, peak X may appear at a Raman shift of 450 cm$^{-1}$ to 600 cm$^{-1}$, and in the Raman spectra obtained by analyzing at least one point P17 to P112, P27 to P212, P37 to P312, and P47 to P412 located in the second region 142b through Raman spectroscopy, peak X may appear at a Raman shift of 450 cm$^{-1}$ to 600 cm$^{-1}$.

Referring to FIG. 6, peaks may appear at Raman shifts near 250 cm$^{-1}$, 360 cm$^{-1}$, 514 cm$^{-1}$, 716 cm$^{-1}$ in the Raman spectrum of a BaTiO$_3$-based material, and four peaks near 250 cm$^{-1}$, 360 cm$^{-1}$, 514 cm$^{-1}$, 716 cm$^{-1}$ may derived from A$_1$(TO), B$_1$+E (TO), A$_1$(TO)+E(TO), A$_1$(LO)+E (LO) vibrations. Here, the peak X appears at a Raman shift of 450 cm$^{-1}$ to 600 cm$^{-1}$, and refer to a peak derived from A1 (TO)+E (TO) vibrations.

According to an exemplary embodiment in the present disclosure, when the minimum value of the Raman shift at which the peak X appears in the Raman spectra of the first regions 141a and 142a is 2&(cm$^{-1}$), the minimum value of the Raman shift at which the peak X appears in the Raman spectra of the second regions 141b and 142b may be λ+0.75 cm$^{-1}$ or more. Hereinafter, the Raman shift at which the peak X appears means a Raman shift value at which the peak X of maximum intensity appears at a Raman shift of 450 cm$^{-1}$ to 600 cm$^{-1}$.

Here, the minimum value z of the Raman shift at which the peak X appears in the Raman spectra of the first regions 141a and 142a may refer to the minimum value of the Raman shift at which the peak X appears when a plurality of points P11 to P16, P21 to P26, P31 to P36, and P41 to P46 located in the first regions 141a and 142a in the central region in the first direction of the cross-sections in the first and third directions of the side margin portions 141 and 142 and equally spaced in the first direction and equally spaced in the third direction are analyzed by Raman spectroscopy.

In addition, the minimum value of the Raman shift at which the peak X appears in the Raman spectra of the second regions 141b and 142b may refer to the minimum value of the Raman shift at which the peak X appears when a plurality of points P17 to P112, P27 to P212, P37 to P312, and P47 to P412 located in the second regions 141b and 142b in the central region in the first direction of the cross-sections in the first and third directions of the side margin portions 141 and 142 and equally spaced in the first direction and equally spaced in the third direction are analyzed by Raman spectroscopy. The number of points located in the first region and the second region may not be particularly limited and may be appropriately selected according to the size of the side margin portion in the first direction and in the third direction.

Referring to FIG. 7, the Raman shift at which the peak X appears may vary depending on stress remaining in the BaTiO$_3$-based material. For example, when a tensile strain relatively acts, the Raman shift value at which the peak X appears may decrease, and when a compressive strain relatively acts, the Raman shift value at which the peak X appears may increase. In particular, the peak X reacts more sensitively to the stress remaining in the BaTiO$_3$-based material than the peaks derived from A$_1$(TO), B$_1$+E(TO) and A$_1$(LO)+E(LO) vibrations. Therefore, in the present disclosure, the stress remaining in the first regions 141a and 142a and the second regions 141b and 142b is evaluated based on the Raman shift value at which the peak X appears. In addition, analyzing the points located in the central region in the first direction of the cross-sections in the first and third directions of the side margin portions 141 and 142 is to evaluate the stress remaining in the central region in the first direction, which is more affected by internal stress than the outer region in the first direction of the cross-sections in the first and third directions of the side margin portions 141 and 142.

That the minimum value of the Raman shift at which the peak X appears satisfies λ+0.75 cm$^{-1}$ or more in the Raman spectra of the second regions 141b and 142b means that the first regions 141a and 142a relatively have tensile stress compared to the second regions 141b and 142b and the second regions 141b and 142b relatively have compressive stress compared to the first regions 141a and 142a.

Accordingly, the first regions 141a and 142a may serve to minimize mismatch with the body 110 in which the dielectric layer 111 and the internal electrodes 121 and 122 are stacked so that the tensile stress is relatively high compared to the side margin portions 141 and 142, thereby preventing a phenomenon in which the interface between the body 110 and the side margin portions 141 and 142 is opened, thereby preventing penetration of external moisture and/or hydrogen to improve reliability of the multilayer electronic component 100.

In addition, as the tensile stress remaining in the side margin portions 141 and 142 increases, cracks may easily occur due to external impact, but, in the multilayer electronic component 100 according to an exemplary embodiment in the present disclosure, since the second regions 141b and 142b adjacent to the outside of the side margin portions 141 and 142 have compressive stress compared to the first regions 141a and 142a, cracks caused by external shocks may be prevented, thereby effectively improve the reliability of the multilayer electronic component 100.

An upper limit of the minimum value of the Raman shift at which the peak X appears in the Raman spectra of the second regions 141b and 142b may not be particularly limited, but may be, for example, λλ+1.2 cm$^{-1}$ or less. When the minimum value of the Raman shift at which the peak X appears in the Raman spectra of the second regions 141b and 142b exceeds λ+1.2 cm$^{-1}$, the interface between the body 110 and the side margin portions 141 and 142 may be opened.

In an exemplary embodiment, when an average value of the Raman shift at which the peak X appears in the Raman spectra of the first region 141a and 142a is λ1 and an average value of the Raman shift at which the peak X appears in the Raman spectra of the second region 141b and 142b is λ2, λ2>λ1 may be satisfied. For example, λ1 may refer to the average value of Raman shifts at which the peak X appears when the plurality of points P11 to P16, P21 to P26, P31 to P36, and P41 to P46 located in the first region are analyzed by Raman spectroscopy, and λ2 may refer to the average value of Raman shifts at which the peak X appears when the plurality of points P17 to P112, P27 to P212, P37 to P312, and P47 to P412 located in the second region are analyzed by Raman spectroscopy. By satisfying λ2>λ1, the effect of minimizing stress mismatch and preventing cracks due to external impact may become more remarkable.

A boundary between the first regions 141a and 142a and the second regions 141b and 142b may be defined as follows. For example, in two imaginary lines adjacent to each other among a plurality of imaginary lines equally spaced in the third direction from the central region in the first direction of the end surfaces of the side margin portions 141 and 142 in the first and third directions, when an average value of the Raman shift at which the peak X appears in the Raman spectra of four points equally spaced from each other located on one imaginary line is λm and when an average value of the Raman shift at which the peak X appears in the Raman spectra of four points equally spaced from each other located on the other imaginary line satisfies $\lambda m+0.5$ cm$^{-1}$ or more, the boundary between the first regions 141a and 142a and the second regions 141b and 142b may be located in the center between the two imaginary lines adjacent to each other.

For example, as illustrated in FIG. 5, in the sixth and seventh imaginary lines L6 and L7 adjacent to each other among a plurality of imaginary lines equally spaced in the third direction, when an average value of the Raman shift at which the peak X appears in the Raman spectra of four points P16, P26, P36, and P46 equally spaced from each other located on the sixth imaginary line L6 is $\lambda m$ and when an average value of the Raman shift at which the peak X appears in the Raman spectra of four points P17, P27, P37, and P47 equally spaced from each other located on the seventh imaginary line L7 satisfies $\lambda m+0.5$ cm$^{-1}$ or more, the boundary between the first region and the second region may be located in the center between the sixth imaginary line L6 and the seventh imaginary line L7. Meanwhile, referring to FIGS. 5 and 8, there are a total of 12 imaginary lines, but the number of imaginary lines may vary depending on the size of the side margin portions 141 and 142 in the third direction.

Referring to FIG. 5, in an exemplary embodiment, the size of the first region 142a in the third direction measured from the central region of the side margin portion 142 in the first direction is T1 and the size of the second region 142b in the third direction measured from the central region of the side margin portion 142 in the first direction is T2, T2/T1 may satisfy 0.6 or more and 2.2 or less. If T2/T1 is less than 0.6, the size of the second region 142b in the third direction may be too small to prevent cracks due to external impact and improve the reliability. If T2/T1 exceeds 2.2, the size of the side margin portions 141 and 142 in the third direction may excessively increases, causing the boundary between the body 110 and the side margin portions 141 and 142 to be opened, thereby deteriorating the reliability of the multilayer electronic component.

A method for adjusting the T2/T1 ratio may not be particularly limited. For example, as the size of the side margin portions 141 and 142 in the third direction increases, the T2/T1 ratio may increase. In addition, the T1 and T2 may be measured, for example, by imaging the cross-sections in the first and third directions taken in the center of the side margin portion in the second direction with a scanning electron microscope (SEM) and defining the boundary between the first regions 141a and 142a and the second regions 141b and 142b through Raman spectroscopy. Other methods and/or tools appreciated by one of ordinary skill in the art, even if not described in the present disclosure, may also be used.

The side margin portions 141 and 142 may be formed by, for example, laminating a dielectric sheet including a dielectric material including BaTiO$_3$-based powder as a main component on the fifth and sixth surfaces 5 and 6 and then performing sintering thereon. The method of adjusting the minimum value of the Raman shift at which the peak X appears in the Raman spectra of the first regions 141a and 142a and the second regions 141b and 142b may not be particularly limited, but, for example, the minimum value of the Raman shift at which the peak X appears in the Raman spectra of the first regions 141a and 142a and the second regions 141b and 142b may be adjusted by sintering the dielectric sheet including a dielectric material including Sn-doped BaTiO$_3$-based powder and adjusting the amount of shrinkage of the side margin portions 141 and 142 during sintering. Accordingly, the side margin portions 141 and 142 may include Sn.

In an exemplary embodiment, an average size of dielectric grains included in the first regions 141a and 142a may be greater than the average size of dielectric grains included in the second regions 141b and 142b, but the present disclosure is not limited thereto. The average size of the dielectric grains included in the first region and the average size of the dielectric grains included in the second region may be obtained by obtaining an image of central region (region K1 of FIG. 4, for example) in the first direction of the side margin portions 141 and 142 in the cross-sections in the first and third directions taken at the center of the multilayer electronic component in the second direction, which is magnified 50,000 times with an SEM and then analyzing the image using an image analysis program, for example, the Zootos Program by the Zootos. Other methods and/or tools appreciated by one of ordinary skill in the art, even if not described in the present disclosure, may also be used.

The average size of the side margin portions 141 and 142 in the third direction may not be particularly limited. However, in general, as the average size of the side margin portions 141 and 142 in the third direction decreases, the reliability of the multilayer electronic component deteriorates. Meanwhile, in the case of the multilayer electronic component according to an exemplary embodiment in the present disclosure, the minimum value of the Raman shift at which the peak X appears in the Raman spectra of the second regions 141b and 142b satisfies $\lambda+0.75$ cm$^{-1}$ or more, the reliability of the multilayer electronic component may be secured even when the average size of the side margin portions 141 and 142 in the third direction is 15 μm or less. A lower limit of the average size of the side margin portions 141 and 142 in the third direction is not particularly limited, but may be, for example, 2 μm or more.

The average size of the side margin portions 141 and 142 in the third direction refers to the average thickness of each of the first side margin portion 141 and the second side margin portion 142. In addition, the average thickness of the side margin portions 141 and 142 may be a value obtained by averaging sizes in the third direction measured from a five equally points in an image obtained by scanning the cross-sections of the side margin portions 141 and 142 in the first and third directions with an SEM. Other methods and/or tools appreciated by one of ordinary skill in the art, even if not described in the present disclosure, may also be used.

In an exemplary embodiment, when the size of the side margin portions 141 and 142 in the third direction corresponding to the central region of the body 110 in the first direction is tm1 and the size of the side margin portions 141 and 142 in the third direction in contact with the ends of the internal electrodes 121 and 122 arranged at the outermost portion based on the first direction is tm2, tm2/tm1 may be greater than or equal to 0.9 and less than or equal to 1.0.

In the related art, since the side margin portion is formed by applying or printing a ceramic slurry, the thickness of the side margin portions varies significantly depending on positions. Specifically, in the related art, the thickness of the first or second side margin portion region corresponding to the central region of the body in the first direction is thicker than that of other regions. As described above, in the case of the related art in which the variations of the thicknesses of positions of the side margin portions are large, the portion occupied by the side margin portions is large in a multilayer electronic component of the same size, and thus, it may be difficult to secure high capacitance because the size of the capacitance forming portion cannot be secured.

Meanwhile, according to an exemplary embodiment in the present disclosure, because tm2/tm1 satisfies 0.9 or more and 1.0 or less, the size of the first and second side margin portions M1 and M2 in the third direction may be formed to be small, thereby forming the capacitance portion Ac.

In addition, the tm2 and tm1 may be measured, for example, by imaging the cross-sections in the first and third directions taken in the center of the side margin portion in the second direction with a scanning electron microscope (SEM). Other methods and/or tools appreciated by one of ordinary skill in the art, even if not described in the present disclosure, may also be used.

In addition, when the thickness of the side margin portions 141 and 142 in contact with the edge of the body 110 is tm3, tm3/tm1 may be 0.9 or more and 1.0 or less. Due to the above characteristics, the variations in thickness of each region of the side margin portions may be reduced and the size of the capacitance forming portion Ac may be secured to be large, thereby implementing the multilayer electronic component having high capacitance.

The average thickness td of the dielectric layer 111 may not be particularly limited. However, as the thickness of the dielectric layer 111 decreases, cracks may easily occur in the body 110 due to stress generated when a voltage is applied, and accordingly, the reliability of the multilayer electronic component may deteriorate. Meanwhile, in the case of the multilayer electronic component according to an exemplary embodiment in the present disclosure, since the minimum value of the Raman shift at which the peak X appears in the Raman spectra of the second regions 141b and 142b satisfies $\lambda+0.75$ cm$^{-1}$ or more, the reliability of the multilayer electronic component may be secured, even when the average thickness td of at least one of the dielectric layers 111 is 0.4 μm or less.

Here, the average thickness td of the dielectric layer 111 refers to the size of the dielectric layer 111 disposed between the internal electrodes 121 and 122 in the first direction. The average thickness of the dielectric layer 111 may be measured by scanning cross-sections of the body 110 in the first and second directions with an SEM at a magnification of 10,000. More specifically, the average value may be measured by measuring the thicknesses at a plurality of points of one dielectric layer 111, for example, at 30 points equally spaced in the second direction. The 30 equally spaced points may be designated in the capacitance forming portion Ac. In addition, if the average value is measured by extending the average value measurement to ten dielectric layers 111, the average thickness of the dielectric layers 111 may be further generalized. Other methods and/or tools appreciated by one of ordinary skill in the art, even if not described in the present disclosure, may also be used.

The average thickness te of the internal electrodes 121 and 122 may not be particularly limited. However, in the case of the multilayer electronic component according to an exemplary embodiment in the present disclosure, since the minimum value of the Raman shift at which the peak X appears in the Raman spectra of the second regions 141b and 142b satisfies $\lambda+0.75$ cm$^{-1}$ or more, the reliability of the multilayer electronic component may be secured even when the average thickness of at least one of the first internal electrodes 121 is 0.4 μm or less and the average thickness of at least one of the second internal electrodes 122 is 0.4 μm or less.

The average thickness te of the internal electrodes 121 and 122 refers to a size of the internal electrodes 121 and 122 in the first direction. Here, the average thickness of the internal electrodes 121 and 122 may be measured by scanning cross-sections of the body 110 in the first and second directions with a scanning electron microscope (SEM) at a magnification of 10,000. More specifically, the average value may be obtained by measuring the thickness at a plurality of points of one internal electrode 121 or 122, for example, at 30 points equally spaced in the second direction. The 30 equally spaced points may be designated in the capacitance forming portion Ac to be described later. The 30 equally spaced points may be designated in the capacitance forming portion Ac. In addition, if the average value is measured by extending the average value measurement to ten internal electrodes 121 and 122, the average thickness of the internal electrodes 121 and 122 may be further generalized. Other methods and/or tools appreciated by one of ordinary skill in the art, even if not described in the present disclosure, may also be used.

The average thickness tc of the cover portions 112 and 113 may not be particularly limited. However, the average thickness tc of the cover portions 112 and 113 may be 20 μm or less in order to reduce the size and increase the capacitance of the multilayer electronic component. As described above, even when the average thickness tc of the cover portions 112 and 113 is 20 μm or less, the reliability of the multilayer electronic component may be secured because the minimum value of the Raman shift at which the peak X appears in the Raman spectra of the second regions 141b and 142b satisfies $\lambda+0.75$ cm$^{-1}$ or more. Here, the average thickness of the cover portions 112 and 113 refers to the average thickness of each of the first cover portion 112 and the second cover portion 113.

The average thickness of the cover portions 112 and 113 may refer to the average size of the cover portions 112 and 113 in the first direction, and may be a value obtained by averaging sizes in the first direction measured at five equally spaced points in the cross-sections of the body 110 in the first and second directions.

Experimental Example

<Raman Shift Measurement of First Region and Second Region>

First, after a body including a dielectric layer and internal electrodes was prepared, a dielectric sheet including a dielectric material including Sn-coated BaTiO$_3$-based powder, additives, solvents, dispersants, etc. was laminated on the fifth and sixth surfaces of the body and then sintered to form a side margin portion. After sintering, the third and fourth surfaces of the body were dipped into a conductive paste for external electrodes including Cu and then sintered to form external electrodes, thereby preparing a sample chip.

Next, a central region in the first direction of the cross-sections in the first and third directions taken at the center of the side margin portion in the second direction was analyzed through Raman spectroscopy. Raman spectroscopy was used for measurement using Raman Spectroscopy (LabRam HR Evolution) equipment, and was performed under conditions of laser wavelength: 532 nm, ND filter: 3.2%, and acquisition time: 15 s.

Referring to FIG. 5, first, first to twelfth imaginary lines are drawn in the third direction at a distance of about 1 μm from each other in the central region in the first direction of the cross-sections in the first and third directions of the side margin portion, and four points located about 5 μm apart from each other located on each imaginary line were analyzed by Raman spectroscopy. Here, the first imaginary line is an imaginary line closest to the body, and the twelfth imaginary line is an imaginary line closest to the outside of the side margin portion.

Thereafter, in the Raman spectra obtained by analyzing four points located on each imaginary line through Raman spectroscopy, a Raman shift value at which the peak X of maximum intensity appears was obtained at a Raman shift of 450 cm$^{-1}$ to 600 cm$^{-1}$, and then the minimum value, maximum value, and average value of the Raman shift at which the peak X appears in the Raman spectra of four points were measured. For example, the minimum value, maximum value, and average value of the Raman shift at which the peak X appears in the Raman spectra of the four points P11 to P41 located on the first imaginary line L1 were measured, and the minimum value, maximum value, and average value of the Raman shift at which the peak X appears in the Raman spectra of the four points P12 to P42 located on the second imaginary line L2 were measured, and thereafter, Raman shift measurement was performed on the third to twelfth imaginary lines L3 to L12 in the same manner and illustrated in FIG. 8.

Referring to FIGS. 5 and 8, it was confirmed that, when the average value of the Raman shifts at which the peak X appears in the Raman spectra of the four points P16 to P46 located on the sixth imaginary line L6 is λm, the average value of the Raman shift at which the peak X appears in the Raman spectra of four points P17 to P47 located on the seventh imaginary line L7 satisfies λm+0.5 cm$^{-1}$ or more, and accordingly, the boundary between the first and second regions is defined as the center between the sixth and seventh imaginary lines L6 and L7 adjacent to each other.

In addition, it was confirmed that, when the minimum value of the Raman shift at which the peak X appears in the Raman spectra of the first region is 2, the minimum value of the Raman shift at which the peak X appears in the Raman spectra of the second region is λ+0.75 cm$^{-1}$ or more.

<Evaluation of Moisture Resistance Reliability Based on T2/T1 Ratio>

Thereafter, moisture resistance reliability was evaluated according to the ratio of the size T2 of the second region in the third direction to the size T1 of the first region in the third direction based on the set boundary between the first region and the second region. Moisture resistance reliability evaluation was performed by mounting 1200 chips per sample chip and applying a voltage of 10 V for 24 hours at a temperature of 85° C. and a relative humidity of 85%, and thereafter, the number of samples having insulation resistance dropped by 1 order or more than from an initial value was listed in Table 1. At this time, among the 1200 sample chips, a case in which the number of samples having insulation resistance dropped by 1 order or more from the initial value was less than 10 was judged as good (○) and a case in which the number of samples having insulation resistance dropped by 1 order or more from the initial value was 10 or more was judged as bad (X)

TABLE 1

| Test No. | T2/T1 | Moisture resistance reliability test | Evaluation |
|---|---|---|---|
| 1 | 0 | 19/1200 | X |
| 2 | 0.5 | 15/1200 | X |
| 3 | 0.6 | 3/1200 | ○ |
| 4 | 0.71 | 1/1200 | ○ |
| 5 | 1 | 0/1200 | ○ |
| 6 | 2.2 | 2/1200 | ○ |
| 7 | 2.5 | Test is not possible | X |

Referring to Table 1, it can be seen that test Nos. 3 to 6, in which the T2/T1 ratio satisfies 0.6 to 2.2, have less than 10 defective samples in the moisture resistance reliability test, and the moisture resistance reliability is improved. Meanwhile, in Test Nos. 1 and 2, it can be seen that the T2/T1 ratio is less than 0.6 and the number of defective samples in the moisture resistance reliability test is 10 or more. This is expected because the size of the second region in the third direction is too small to prevent cracks due to external impact, resulting in reduced reliability. Meanwhile, the test No. 1 in which the T2/T1 ratio is 0 means that the second region defined in the present disclosure was not formed.

In addition, in the case of Test No. 7, the T2/T1 ratio exceeds 2.2, and the interface between the body and the side margin portion was opened, so the moisture resistance reliability test could not be performed.

As one of the various effects of the present disclosure, it is possible to secure moisture resistance reliability of the multilayer electronic component, while the thickness of the side margin portion is reduced.

While example exemplary embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed in a first direction with the dielectric layer interposed therebetween and including first and second surfaces facing each other in the first direction, third and fourth surfaces connected to the first and second surfaces and facing each other in a second direction, and fifth and sixth surfaces connected to the first to fourth surfaces and facing each other in a third direction;
an external electrode disposed on the third and fourth surfaces; and
a side margin portion disposed on the fifth and sixth surfaces,
wherein the side margin portion includes a first region adjacent to the internal electrodes and a second region adjacent to outside of the side margin portion, and in a Raman spectra obtained by analyzing at least one point located in the first region and at least one point located in the second region in a central region in the first direction in a cross-section in the first and third directions of the side margin portion through Raman spectroscopy, peak X appears in a Raman shift of 450 cm$^{-1}$ to 600 cm$^{-1}$, and when a minimum value of the Raman shift at which the peak X appears in the Raman spectra of the first region is λ (cm$^{-1}$), a minimum value of the Raman shift at which the peak X appears in the Raman spectra of the second region is λ+0.75 cm$^{-1}$ or greater.

2. The multilayer electronic component according to claim 1, wherein the minimum value of the Raman shift at which the peak X appears in the Raman spectra of the second region is λ+0.75 cm$^{-1}$ or greater and λ+1.2 cm$^{-1}$ or less.

3. The multilayer electronic component according to claim 1, wherein λ2>λ1, in which 2l is an average value of the Raman shifts at which the peak X appears in the Raman spectra of the first region and λ2 is an average value of the Raman shifts at which the peak X appears in the Raman spectra of the second region.

4. The multilayer electronic component according to claim 1, wherein,
in two imaginary lines adjacent to each other among a plurality of imaginary lines equally spaced in the third direction from the central region in the first direction of the end surfaces of the side margin portion in the first and third directions,
when an average value of the Raman shift at which the peak X appears in the Raman spectra of four points equally spaced from each other located on one imaginary line is λm and when an average value of the Raman shift at which the peak X appears in the Raman spectra of four points equally spaced from each other located on the other imaginary line satisfies λm+0.5 cm$^{-1}$ or more, the boundary between the first region and the second region is located in a center between the two imaginary lines adjacent to each other.

5. The multilayer electronic component according to claim 1, wherein the cross-section of the side margin portion in the first and third directions is a cross-section taken in a center of the side margin portion in the second direction.

6. The multilayer electronic component according to claim 1, wherein, when a size of the first region in the third direction measured in the central region of the side margin portion in the first direction is T1 and a size of the second region in the third direction measured in the central region of the side margin portion in the first direction is T2, T2/T1 satisfies 0.6 or more and 2.2 or less.

7. The multilayer electronic component according to claim 1, wherein the side margin portion includes a $BaTiO_3$-based material as a main component.

8. The multilayer electronic component according to claim 1, wherein the side margin portion includes Sn.

9. The multilayer electronic component according to claim 1, wherein an average size of the side margin portion in the third direction is 15 μm or less.

10. The multilayer electronic component according to claim 1, wherein an average thickness of the dielectric layer is 0.4 μm or less.

11. The multilayer electronic component according to claim 1, wherein
an average thickness of the first internal electrodes is 0.4 μm or less, and
an average thickness of the second internal electrodes is 0.4 μm or less.

12. The multilayer electronic component according to claim 1, wherein, when a size of the side margin portion region in the third direction corresponding to the central region of the body in the first direction is tm1 and a size of the side margin portion region in the third direction contacting an end of the internal electrode disposed at an outermost portion based on the first direction is tm2, tm2/tm1 is 0.9 or more and 1.0 or less.

13. The multilayer electronic component according to claim 1, wherein, when a size of the side margin portion region in the third direction corresponding to the central region of the body in the first direction is tm1 and a thickness of the side margin portion region contacting an edge of the body is tm3, tm3/tm1 is 0.9 or more and 1.0 or less.

14. The multilayer electronic component according to claim 1, wherein the first internal electrode is connected to the third, fifth and sixth surfaces, and the second internal electrode is connected to the fourth, fifth and sixth surfaces.

15. The multilayer electronic component according to claim 1, wherein the side margin portion includes Sn-doped $BaTiO_3$-based powder.

16. The multilayer electronic component according to claim 15, wherein, when a size of the first region in the third direction measured in the central region of the side margin portion in the first direction is T1 and a size of the second region in the third direction measured in the central region of the side margin portion in the first direction is T2, T2/T1 satisfies 0.6 or more and 2.2 or less.

17. The multilayer electronic component according to claim 16, wherein the minimum value of the Raman shift at which the peak X appears in the Raman spectra of the second region is λ+0.75 cm$^{-1}$ or greater and λ+1.2 cm$^{-1}$ or less.

18. The multilayer electronic component according to claim 17, wherein λ2>λ1, in which λ1 is an average value of the Raman shifts at which the peak X appears in the Raman spectra of the first region and λ2 is an average value of the Raman shifts at which the peak X appears in the Raman spectra of the second region.

* * * * *